United States Patent [19]
Allen et al.

[11] 4,073,599
[45] Feb. 14, 1978

[54] HOLLOW TURBINE BLADE TIP CLOSURE

[75] Inventors: James M. Allen, Bromall, Pa.;
Thomas M. Szewczuk, Claymont, Del.

[73] Assignee: Westinghouse Electric Corporation, Pittsburgh, Pa.

[21] Appl. No.: 717,967

[22] Filed: Aug. 26, 1976

[51] Int. Cl.² ............................................. F01D 5/18
[52] U.S. Cl. ................................. 416/97 R; 416/232
[58] Field of Search ....................... 416/232, 96, 97, 92

[56] References Cited
U.S. PATENT DOCUMENTS

| | | | |
|---|---|---|---|
| 3,369,792 | 2/1968 | Kraimer et al. | 416/97 X |
| 3,574,482 | 4/1971 | Savage et al. | 416/232 X |
| 3,982,851 | 9/1976 | Andersen et al. | 416/232 X |

FOREIGN PATENT DOCUMENTS 212,964  3/1957  Australia .................................. 416/96

Primary Examiner—Everette A. Powell, Jr.
Attorney, Agent, or Firm—E. C. Arenz

[57] ABSTRACT

An arrangement for closing selective areas of the tip portion of a hollow turbine blade having internal serpentine coolant passages is provided by radially extended wall portions at the tip of the blade along at least two sides of the outer ends of each two adjacent internal passages to be closed at the tip, retaining grooves provided in the facing surfaces of the extended wall portions, cover means overlie the outer ends of the selected adjacent passages and have opposite lateral edges received in the retaining grooves, and bond means secure the cover means along the lateral edges to the wall portions. The cover plate means preferably takes the form of two or more separable plates which can be independently inserted into the retaining grooves from an area on the tip portion of the blade which does not have the radially extended walls with retaining grooves therein.

1 Claim, 4 Drawing Figures

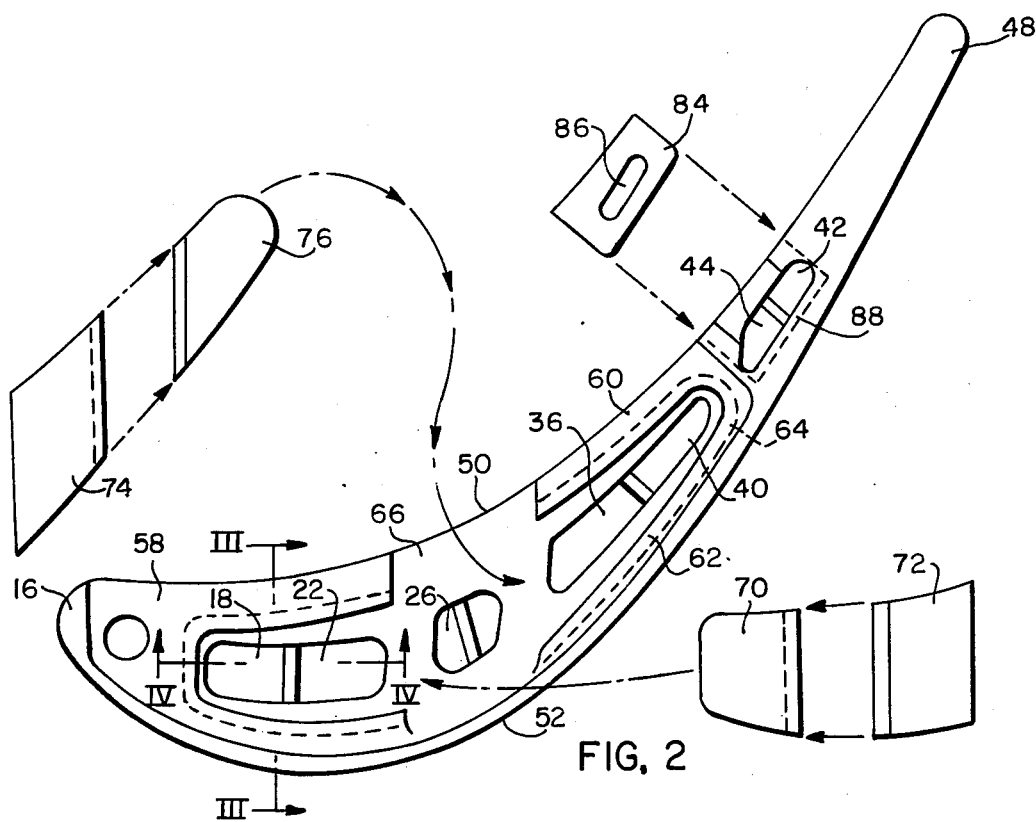
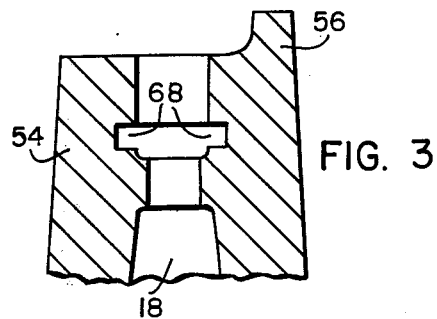
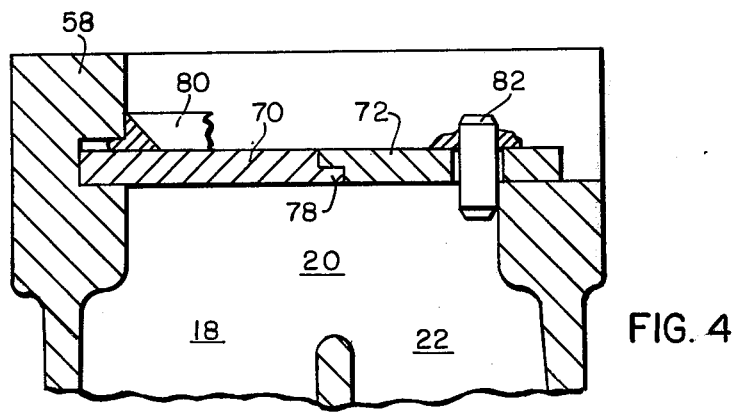

HOLLOW TURBINE BLADE TIP CLOSURE

BACKGROUND OF THE INVENTION

1. Field of the Invention

The invention pertains to the art of cast, hollow turbine blades having internal serpentine coolant passages and in particular to an arrangement for closing selected areas of the tip portion of the blade.

2. Description of the Prior Art

One well known arrangement employed in the air cooling of modern gas turbine rotor blades is to provide a hollow blade which includes long, serpentine shaped paths for the coolant to traverse and absorb large quantities of heat before the coolant is exhausted from the blade. The complex internal configuration of the blade dictates, as a practical matter, that the blade be made by an investment casting method. However, with this method the final cooling circuitry cannot be produced from the casting process because the ceramic cores used to form the internal cavities must extend through the blade tip so that adequate support can be provided for the cores to prevent their shifting when the metal is poured in the casting process. The result is that openings at the radially outer ends of adjacent passages which are to be connected in a return bend configuration must be closed off after the casting.

The aim of this invention is to provide a blade tip configuration and closure arrangement which accomplishes this in a way which simultaneously meets a rather stringent set of both sealing and structural requirements.

Examples of prior art turbine blade and tip cap constructions therefor of which we are aware, but which are not considered particularly pertinent to this invention, are found in U.S. Pat. Nos. 3,854,842, 3,846,041 and 3,628,885.

SUMMARY OF THE INVENTION

In accordance with the invention, a cover plate and blade tip portion structural arrangement is provided for a turbine blade having a main cast portion with a plurality of generally radially extending passages for coolant flow with the outer ends of the passages being open following casting of the main portion of the blade. The arrangement includes radially extended wall portions at the tip portion of the blade at least two sides of the outer ends of each two adjacent passages to be covered at the tip portion, with retaining grooves being formed in the facing surfaces of the extended wall portions, and cover means overlying the outer ends of the selected adjacent passages and having opposite lateral edges received in the retaining grooves and bonding means secures the cover means along the lateral edges to the wall portions.

DRAWING DESCRIPTION

FIG. 2 is an exploded view of the outer end face of the blade with the cover plates shown in exploded relation and before assembly to the tip portion of the blade;

FIG. 3 is a fragmentary sectional view corresponding to one taken along the line III-III; and FIG. 4 is a fragmentary sectional view corresponding to one taken along the line IV-IV of FIG. 2 and including a retaining pin.

DESCRIPTION OF THE PREFERRED EMBODIMENT

Figure 1:
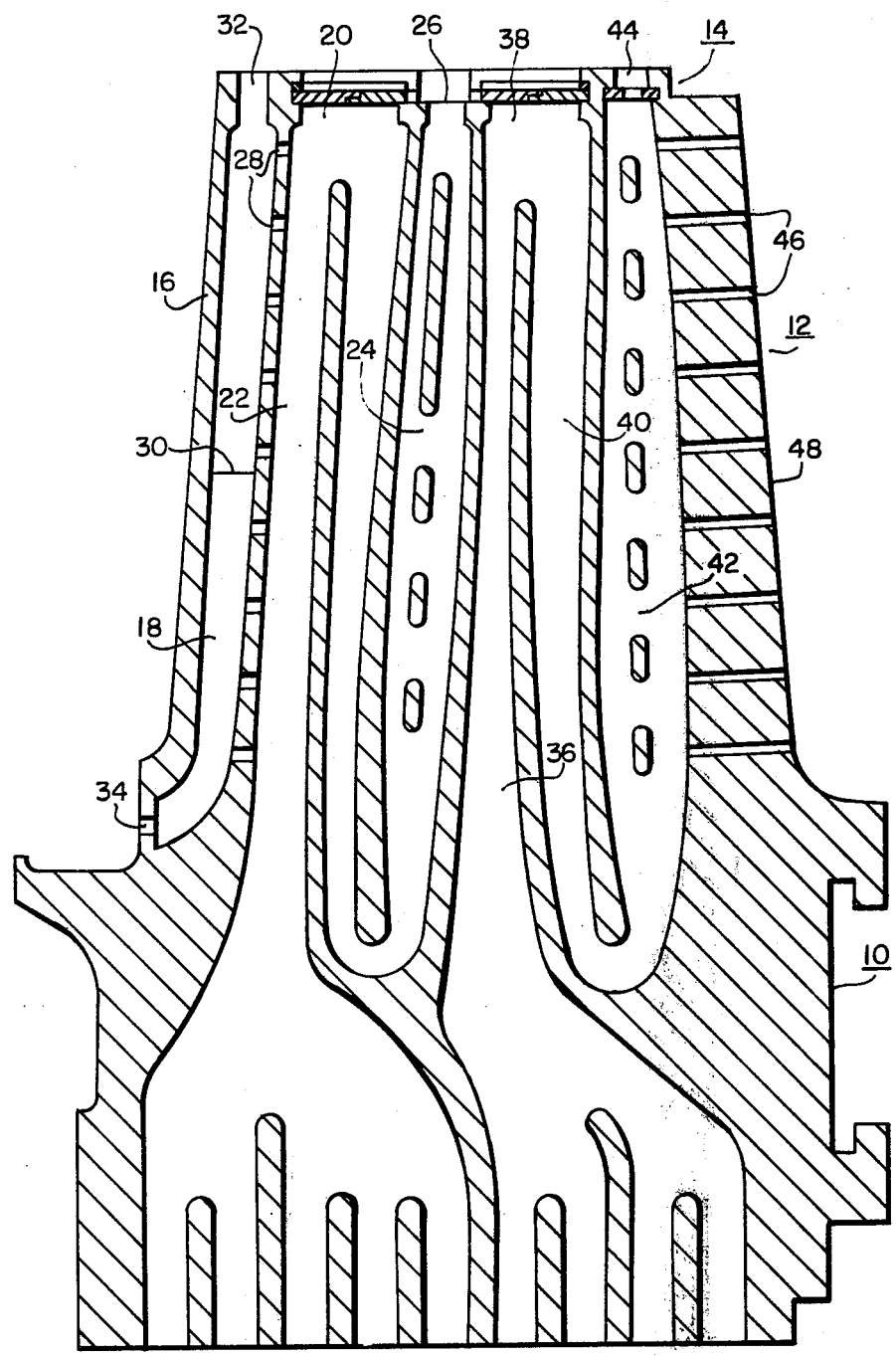
FIG. 1 is a cross-section corresponding to one taken along a center line of the airfoil of a turbine blade according to the invention.

Referring to FIG. 1, the main, cast portion of the turbine blade comprises the root section 10 and an airfoil shaped section 12, both sections being cast integrally with suitable cores to result in the formation of the various internal cavities. The tip portion of the blade, generally designated 14, generally comprises radially extended walls and cover plate means as will be described in some detail hereinafter.

In the exemplary embodiment shown, two separate triple pass air cooling circuits are provided, with the coolant air entering the circuits through the root 10 as indicated by the directional arrows. In the first circuit, which is closer to the leading edge 16 of the blade, air flows radially outwardly through passage 18, turns in the return bend area 20, flows radially inwardly through passage 22 and then turns at the base of the airfoil section and flows radially outwardly through passages 24 and out through the exhaust opening 26. Part of the air flowing up passage 18 is bled off through a number of small holes 28 in the separating rib 30 into the passage immediately behind the leading edge 16, the jets of air through the small holes impinging upon the inner surface of the leading edge for cooling purposes and then being exhausted through outlet ports 32 and 34 at the tip and near the base, respectively.

The flow through the other triple pass circuit is similar and includes flow from the root radially outwardly through passage 36 toward the tip where the flow is reversed in the return bend 38 area and is directed radially inwardly through passage 40 toward the base or root. There it again reverses and flows radially outwardly through passage 42 to the exhaust outlet 44 at the tip. Bleed holes 46 are provided in the trailing edge 48 so that air may be bled from passage 42 through the trailing edge structure for cooling purposes.

Referring to FIG. 2, the airfoil shape of the blade as viewed from the tip portion 14 is apparent and includes a concave side 50 and a convex side 52. As cast, the blade has all of the passages in the airfoil section open at the tip portion following the casting process. As such, the adjacent passages 18 and 22 of the first circuit must be closed and substantially sealed at the tip portion in order to form the return bend 20 in the circuitry, and likewise the adjacent passages 36 and 40 of the second circuit must also be closed at the tip portion. In accordance with the invention, the tip portion is provided with structure which cooperates with cover plate means to accomplish this.

The general tip configuration can be formed by machining, or cast to approximate size and then further machined. Referring to FIG. 2, the walls along at least two sides of the outer ends of each of the two adjacent passages to be covered at the tip are extended sufficiently to accommodate using a milling cutter to cut retaining grooves in the facing surfaces of the extended wall portions. Specifically, and referring to the outer open ends of the adjacent passages 18 and 22, a wall 54 is radially extended generally along the concave side 50, and opposite wall 56 is extended generally along the convex side 52 and a transverse end wall 58 extends between the walls 54 and 56. For the structure at the tip portion adjacent the open outer ends of the passages 36 and 40, the radially extended walls include wall 60 on the concave face side, wall 62 on the convex face side and transverse wall 64 extending between the other two walls at the trailing end side. Thus in the embodiment illustrated there is a three-walled cavity at the tip portion of the blade embracing the end areas of the blade having the outer ends of both the passages 18 and 22 and the outer ends of the passages 36 and 40, with these three-walled cavities being disposed in mirror image relation. The area 66 of the tip portion encompassing the outlet or exhaust opening 26 from the first circuit is in radially recessed relation to the outer end edges of the walls forming the three-walled cavities. This permits a milling cutter to be moved radially inwardly into a position in which it can be moved along the wall forming the three-wall cavities to cut the retaining grooves 68 as best seen in FIG. 3.

Cover plate means for overlying the outer ends of the adjacent passages 18 and 22 and 36 and 40, are fabricated from material such as superalloy sheet stock. In the illustrated blade, two separate plates are provided for each of the openings to be covered. In FIG. 2 the plates for covering the opening defined by the ends of the passages 18 and 22 are identified as 70 and 72, while those for covering the outer open ends of the passages 36 and 40 are identified as 74 and 76. The plates are made in two pieces so that the dimension of each plate in a leading-to-trailing blade edge direction is less than the dimension between the facing edges of the three-wall cavities on the opposite sides of the open area 66 around the outlet opening 26. Thus to install the cover plates, the plate 70 is first moved into position overlying the area 66 so that the lateral edges of the plate can be received in the retaining grooves 68. After plate 70 is slid into position toward the leading edge, then plate 72 is positioned and slid toward the leading edge in the retaining grooves 68 also. A lap joint 78 (FIG. 4) is provided where the edges of the two plates meet. A similar lap joint is provided for the two plates 74 and 76, which are installed in their overlying relation over the passages 36 and 40 by sliding them in sequence in a direction toward the trailing edge of the blade.

After the plates have been installed to overlie the outer open ends of the passages where return bends are to be formed, a high temperature braze 80 is applied at the joints between the plates and the extended walls. The purpose of the braze is to substantially seal the assembly from leaking cooling air and to retain the plates from backing out into the area 66 and flying off the blade tip when the blade is in service.

The arrangement of the parts according to the invention results in an assembly that simultaneously meets a relatively stringent set of both sealing and structural requirements. Bending of the cover plates due to the high centrifugal force is minimized because each plate assembly is captured along its long edges by the retaining grooves. The structural integrity of the plates does not depend upon the brazing since the main function of the braze is to provide an adequate, although not perfect, seal. In this connection it is noted that in service the large differential thermal expansions which occur between the plates and blade tips will probably cause the brazing to crack along some part of the length of the braze. However, it is extremely unlikely that the joint would crack to a point where the plates would be totally loosened because the cracking need only progress to the point where internal stresses are diminished to a level where crack propagation ceases. While some leakage will occur after this happens it will be minimal because the leakage area of the cracks will be small compared to what can be achieved in a purely mechanical assembly.

Since it is very unlikely that the brazing would crack completely loose and allow the plates to back out, ordinarily no locking device is considered necessary. However, should additional locking be deemed desireable, this can be readily accomplished with the arrangement by providing a retaining pin 82 (FIG. 4) which projects through the plate which is closest to the entry slot area of the three-walled cavities. This retaining pin is then welded to the plate which, as noted, is of a superalloy, weldable material. The cast blade material is not weldable by conventional means.

In the embodiment shown in FIG. 2, the exhaust orifice 44 adjacent the trailing edge is of a size which preferably should be restricted to obtain the proper flow through the bleed holes 46 leading to the trailing edge. Accordingly, an orifice cover plate 84 is provided with a restricted opening 86 therein, to overlie the open end of the passage 42. The general concept of the invention is followed in the arrangement of the exhaust orifice by providing another three-walled cavity generally indicated by the numeral 88 and providing retaining grooves in the walls so that the orifice plate 84 may be slipped into position from the opening to the retaining grooves on the concave side of the blade.

While the illustrated embodiment described includes the area 66 adjacent the outlet opening 26 being devoid of any walls at all extending radially outwardly, to facilitate the use of a milling cutter and the entry of the cover plates into the retaining grooves, it will be appreciated that radially extended walls could be provided adjacent the concave face and the convex face of the blade in this area so long as the walls were not so thick as to encroach upon the open area needed for the entry of the milling cutter to cut the retaining grooves or to obstruct the manipulation of the cover plates into position to be slid into the retaining grooves.

We claim:
1. A turbine blade having its main portion of cast material and having at least two internal serpentine coolant passages, comprising:
    means forming one coolant passage including an outer return bend space on the leading edge side of an intermediate exhaust opening for the first passage in the tip portion of the blade, and means forming another passage having an outer return bend space on the trailing edge side of said exhaust opening;
    said blade having radially extended wall portions along at least the convex and concave face sides of said blade projected in a radially outward direction from said return bend spaces and being devoid of said extended walls in the area of the blade tip around said exhaust opening, said extended wall means including retaining grooves formed in the facing surfaces to receive cover plate means;
    cover plate means of a weldable material substantially closing said return bend spaces, said cover plate means comprising a pair of plates for each return bend space, each pair of plates including a lapping joint and each plate having a dimension in a leading-to-trailing blade edge direction which accommodates entry of the plate into the grooves from the area around said exhaust opening;
    said extending wall portions include transverse walls, extending between the walls along the convex and concave face sides of said blade, at the ends of said walls opposite exhaust opening, said transverse walls including retaining grooves to receive the leading and trailing end edges respectively of said cover plates means; and means for holding said cover plate means in position in said grooves comprising a brazed joint between said plate means and said extended walls and pin means projecting through said cover plate means and into said return bend spaces to prevent movement of said plate means back out of said grooves, said pin means being welded to said cover plate means.

* * * * *